3,309,223
TREATMENT OF SHAPED ARTICLES WITH A SULPHONIUM COMPOUND AND A REACTIVE POLYMERIC SUBSTANCE
John Bryn Owen and Harold Sagar, Manchester, England, assignors to Imperial Chemical Industries Limited, London, England, a corporation of Great Britain
No Drawing. Filed Dec. 2, 1963, Ser. No. 327,523
Claims priority, application Great Britain, Dec. 3, 1962, 45,466/62
9 Claims. (Cl. 117—139.5)

This invention relates to the treatment of shaped articles composed of a major proportion of hydrophobic polymeric material, and more particularly to the treatment of woven or knitted textile fabrics containing at least 50% by weight of hydrophobic synthetic fibres.

It has already been proposed in Belgian Patent No. 600,424 to interact in the presence of an alkaline or potentially alkaline catalyst polymeric substances containing at least one reactive —OH, =NH or —SH group in each molecule with a sulphonium salt which, in the presence of the catalyst, liberates the following sulphonium cation with two free valences

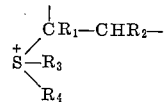

where $R_1$ and $R_2$ may be hydrogen or a lower alkyl group and may be the same or different, and $R_3$ and $R_4$ may be the group

or an alkyl, substituted alkyl, alicyclic, aralkyl, aromatic or heterocyclic residue and may be the same or different.

The lower alkyl group is preferably one containing 1 to 3 carbon atoms. The substituent on the alkyl residue preferably does not contain —OH, =NH or —SH groups but may be, for example, carboxyl, nitrile or halogen.

We have now found that by making certain modifications the abovementioned process can be adapted and is especially valuable for improving the properties of shaped articles composed of a major proportion of hydrophobic polymeric material.

By the term hydrophobic polymeric material we mean polymeric material which has a limited capacity for absorbing moisture. Such material includes polyolefines, such as polyethylene and polypropylene, polyamides such as nylon, including polymers of caprolactam, polyesters such as polyethylene terephthalate, polymers and copolymers of acrylonitrile, cellulose esters such as cellulose triacetate and glass.

Shaped articles composed of hydrophobic polymeric material may be of any desired kind. They may be obtained from the polymeric material by any known shaping process for example by casting, moulding or extrusion. The process of our invention is particularly applicable, however, to filaments, fibres, foils and films composed of hydrophobic polymeric material, and especially to textile materials comprising such filaments or fibres. Textile materials include rovings, yarns, non-woven webs and woven and knitted fabrics as well as filaments and fibres. Such textile materials may consist wholly of hydrophobic polymeric material or may consist of hydrophobic polymeric material admixed with other textile material provided that the hydrophobic polymeric material constitutes a major proportion of the whole.

It is well known that shaped articles made from hydrophobic polymeric material besides having a very limited capacity for absorbing moisture become electrified readily when subjected to friction. These properties are disadvantageous in that the electrified articles readily attract dirt and dust. Moreover, film composed of hydrophobic polymeric material which has become electrified is difficult to handle in that it becomes attracted to and clings to other articles. Further, textile materials composed of hydrophobic polymeric material which are used for clothing, besides having the disadvantage of soiling readily, tend to be uncomfortable in wear owing to the limited capacity for absorbing moisture. It is an object of the present invention to decrease the hydrophobic properties and reduce the tendency of such shaped articles to become electrified.

According to the present invention we provide a process for the treatment of shaped articles composed of a major proportion of hydrophobic polymeric material in which the said articles are contacted in presence of an alkali with a sulphonium compound as hereinbefore defined and with an aqueous solution of a reactive polymeric substance having at least one reaction —OH, =NH or —SH group in each molecule, the increase in the dry weight of the shaped article resulting from the treatment being from 0.2% to 3%.

Usually the major proportion of the weight increase is brought about by deposition on the shaped article of the reactive polymeric substance, and it may only be necessary to use just sufficient of the sulphonium compound to destroy the solubility of the polymeric substance in aqueous media such as water or dilute acids or alkalis. Usually the sulphonium compound is used in the proportion of from 1% to 20% by weight of the reactive polymeric substance but these proportions are not critical. The proportion of alkali employed must be sufficient to induce reaction between the sulphonium compound and the reactive polymeric substance under the selected reaction conditions, and usually enough alkali is employed to neutralise any acidity arising from the decomposition of the sulphonium compound. The alkali is always used in the form of an aqueous solution and normal working concentrations of such solutions would be from 0.1% to 5%.

Suitable sulphonium salts are:
(1) β-haloethyl salts such as for example

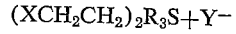

or $(XCH_2CH_2)_3S{+}Y^-$ where $R_3$ has the meaning given above, X represents halogen and $Y^-$ represents an anion. An example of such salts is tris-(β-chloroethyl)sulphonium chloride.

(2) Esters of mono-, bis- or tris-β-hydroxyethyl sulphonium salts such as for example—

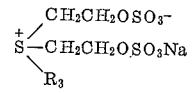

where $R_3$ has the meaning given above. The disodium salt of tris (β-sulphatoethyl)sulphonium inner salt, which has the formula

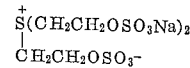

is our preferred sulphonium compound.

Alkalis suitable for use in the invention are for example any of the hydroxides, bicarbonates or carbonates of the alkali metals, but other alkaline substances may be used if desired for example, ammonium carbonate, trisodium phosphate, sodium sesquicarbonate and borax.

Suitable reactive polymeric substances for use in the process of the invention are those which are soluble in aqueous media for example water, or dilute aqueous solutions of acids or alkalis. Usually the substances are strongly film forming solids for example starch and starch ethers, cellulose ethers such as carboxymethyl cellulose and the hydroxyalkyl celluoses, glue and gelatin or synthetic polymeric substances such as the condensation products of ethylene oxide and polyamide forming substances which are mentioned in German patent specification No. 1,023,743. Mixtures of such polymeric compounds may be employed if desired. Especially preferred groups of polymeric substances are the hydroxyalkyl celluloses particularly hydroxyethyl cellulose, and the abovementioned ethylene oxide/polyamide condensation products.

The shaped artices may be treated simultaneously or consecutively in any order with the alkali, the sulphonium salt and the reactive polymeric substance. These ingredients are applied from aqueous media. Thus, for example, in carrying out the present invention on textile fabrics the fabrics may be impregnated with the sulphonium salt and the polymeric substance in aqueous solution, which may be alkaline, or the fabric may be treated with alkali as a separate step. For example, the fabrics may be impregnated with an aqueous solution of the sulphonium salt and the polymeric substance, optionally dried and then impregnated at room temperature with an aqueous solution of a strong alkali such as sodium hydroxide the fabric being subsequently rinsed and neutralised. Sulphonium salts which are soluble in water or alkali are preferably employed but if desired aqueous dispersions or emulsions can be used. When the polymeric substance is not soluble in water or dilute alkali but is soluble in dilute acid, the acid solution of the polymeric substance is used in a separate step from the alkali to avoid precipitation.

When strong alkalis such as sodium hydroxide are employed in the treatment, reaction between the sulphonium compound and the polymeric substance may be very rapid even at room temperature, accordingly it is then unnecessary to employ a subsequent heating step to complete the reaction and it usually suffices to rinse neutralise and dry the shaped article to complete the treatment. But if mildly alkaline substances such as sodium bicarbonate or carbonate are employed drying and heating to from 60° C. to 220° C. for from 20 seconds to 5 minutes may be necessary. After the heating step the shaped article is rinsed and dried.

Shaped articles treated according to the present process are altered very little in appearance and retain their desirable characteristics. Textile materials composed of hydrophobic polymeric material retain their inherent characteristics, such as resistance to creasing or crushing, but usually they feel fuller and warmer to the touch. Their moisture absorbency is improved as a result of the treatment and their tendency to become electrified and to soil is diminished. These desirable properties are not easily destroyed by repeated washing and cleaning operations.

The process of the invention may be applied to textile materials, before, in conjunction with, or after any other chemical or mechanical finishing operations such as those used to confer resistance to shrinkage and creasing, modification of handle or surface lustre, water repellency and optical brightness.

The invention is illustrated but not limited by the following examples in which parts and percentages are by weight.

Example 1

A polyethylene terephthalate fibre fabric was impregnated with an aqueous solution containing 2 parts of a hydroxyethylated cellulose, 1 part of a 20% aqueous solution of disodium tris($\beta$-sulphatoethyl)sulphonium inner salt, and 97 parts of water and squeezed so as to retain 50% of its dry weight of liquor. After drying at 60° C. the fabric was then impregnated with a solution containing 4 parts of caustic soda and 96 parts of water and squeezed to remove excess liquor, and subsequently rinsed and neutralised.

After drying, the fabric was found to possess a full handle, had a reduced tendency to acquire charges of static electricity and had enhanced moisture absorbency. These effects were maintained after washing. The treated fabric, furthermore, could be dyed with substantive cotton dyestuffs.

Example 2

A nylon continuous filament fibre fabric was impregnated with an aqueous solution containing 2 parts of a hydroxyethylated cellulose, 0.5 part of a 20% aqueous solution of disodium tris($\beta$-sulphatoethyl)sulphonium inner salt, 0.5 part of soda ash and 97.1 parts of water, and squeezed so as to retain 50% of its dry weight of liquor. After drying at 60° C. and baking at 150° C. for 3 minutes the fabric was washed in a solution containing 0.1% of a non-ionic detergent and 0.1% soda ash for 5 minutes at 60° C., rinsed with water and dried.

Compared to an untreated control fabric, the treated fabric in addition to having a reduced tendency to acquire charges of static electricity also possessed enhanced moisture absorbency, and enhanced affinity for cellulose substantive optical brightening agents.

Example 3

A fabric composed of 33 parts of cotton and 67 parts of a polyethylene terephthalate was treated as in Example 1.

Compared to the untreated fabric the treated fabric has a reduced tendency to pick up soil when washed in the presence of soiled fabrics.

Example 4

A nylon continuous filament fibre fabric was impregnated with an aqueous solution containing 2 parts of sodium alginate, 1 part of a 20% aqueous solution of disodium tris($\beta$-sulphatoethyl)sulphonium inner salt, 1 part of sodium bicarbonate and 96 parts of water and squeezed so as to retain 50% of its dry weight of liquor. After drying at 60° C. and baking at 150° C. for 3 minutes the fabric was rinsed with water to remove loosely adhering materials and dried.

The resulting fabric was found to possess a reduced tendency to acquire electrostatic charges and this effect was maintained on washing.

Example 5

An acrylic fibre fabric was impregnated with a solution containing 2 parts of hydroxyethylated cellulose, 0.5 part of a 20% aqueous solution of disodium tris($\beta$-sulphatoethyl) sulphonium inner salt, 0.7 part of sodium sesquicarbonate and 96.8 parts of water, and was squeezed so as to retain 125% of its dry weight of liquor. After drying at 60° C. and baking at 125° C. for 4 minutes the fabric was rinsed with water to remove loosely adhering materials and dried.

The treated fabric had increased affinity for substantive cotton dyestuffs and also a reduced tendency to acquire electrostatic charges.

Example 6

A glass fibre fabric was treated as in Example 1.

Compared with an untreated control fabric, the treated fabric had increased affinity for the substantive cotton dyestuffs.

Example 7

A polypropylene fibre fabric was treated as in Example 1.

Compared with an untreated control fabric, the treated fabric had increased affinity for substantive cotton dyestuffs.

Example 8

A cellulose acetate fabric was treated as described in Example 5.

Compared with a control untreated fabric, the fabric has a reduced tendency to acquire static electricity. This effect was maintained after washing.

*Example 9*

A nylon continuous filament fibre fabric was treated as in Example 1 with a solution containing 2 parts of a partially hydrolysed polyvinyl acetate and 1 part of a 20% aqueous solution of disodium tris(β-sulphatoethyl) sulphonium inner salt and 97 parts of water and squeezed so as to retain 50% of its dry weight of liquor. After drying at 60° C. the fabric was impregnated with a solution containing 4 parts of caustic soda and 96 parts of water and squeezed to remove excess liquor.

After rinsing with water, scouring with acetic acid and treating with a dilute solution of sodium bicarbonate, followed by rinsing, the fabric was dried.

The fabric was found to have a reduced tendency to acquire an electrostatic charge.

*Example 10*

A nylon continuous filament fibre fabric was treated as described in Example 5 with a solution containing 0.8 part of a condensate of polyamide-forming compounds and ethylene oxide (as described in Example 3 of German patent specification No. 1,023,743), 2 parts of a 20% aqueous solution of disodium tris(β-sulphatoethyl)sulphonium inner salt, 1 part of sodium bicarbonate and 96.2 parts of water, and squeezed so as to retain 50% of its dry weight of liquor.

After drying at 60° C. and baking at 150° C. for 3 minutes, the fabric was rinsed thoroughly in water to remove loosely adhering materials and dried.

The treated fabric, in addition to having a reduced tendency to acquire an electrostatic charge, was found to have improved moisture absorbency.

These properties were maintained after washing.

*Example 11*

A nylon continuous filament fibre fabric was impregnated with an aqueous solution containing 2 parts of the acetic acid salt of a partially deacetylated chitin, 1 part of a 20% aqueous solution of disodium tris(β-sulphatoethyl)sulphonium inner salt and 97 parts of water and squeezed so as to retain 50% of its dry weight of liquor. After drying at 60° C. the fabric was then impregnated with a solution containing 4 parts of caustic soda and 96 parts of water and squeezed to remove excess liquor, rinsed with water and dried.

Compared to an untreated control fabric, the treated fabric had a reduced tendency to acquire an electrostatic charge and had increased affinity for the direct cotton dyestuffs.

*Example 12*

A polyethylene terephthalate fibre fabric was impregnated with an aqueous solution containing 3 parts of a starch dextrin, 2 parts of a 20% aqueous solution of disodium tris(β-sulphatoethyl)sulphonium inner salt, 0.5 part of trisodium phosphate and 94.5 parts of water and squeezed so as to retain 50% of its dry weight of liquor. After drying at 65° C. and baking at 150° C. for 3 minutes the fabric was rinsed thoroughly with water to remove loosely adhering materials and dried.

The treated fabric, which possessed a full handle, had a reduced tendency to acquire an electrostatic charge.

*Example 13*

A piece of a polyester film was impregnated with an aqueous solution containing 0.8 part of a hydroxyethylated cellulose, 0.2 part of a 20% aqueous solution of disodium tris(β-sulphatoethyl)sulphonium inner salt, 0.2 part of sodium carbonate, and 98.8 parts of water and squeezed between two glass rods so as to retain 100% of its dry weight of liquor. After drying at 70° C. the film was baked at 150° C. for 3 minutes, rinsed with water to remove any unreacted material, and dried.

The resulting film, which possessed some affinity for cotton dyestuffs, was found to have a reduced tendency to acquire charges of static electricity.

What we claim is:

1. Process for the treatment of shaped articles composed of a major proportion of hydrophobic polymeric material whereby the hydrophobicity and tendency to soil and acquire electrostatic charges of the said material are reduced, comprising contacting said articles in the presence of an alkali, with a sulphonium compound which liberates the following sulphonium cation with two free valences.

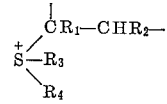

where $R_1$ and $R_2$ independently represent hydrogen and lower alkyl group and $R_3$ and $R_4$ independently represent the group

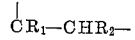

and an alkyl, substituted alkyl, alicyclic, aralkyl, aromatic and heterocyclic residue, and with an aqueous solution of a reactive film-forming polymeric substance, said substance being soluble in an aqueous media and having at least one reactive —OH, =NH and —SH group in each molecule, the increase in the dry weight of the shaped article resulting from the treatment being from 0.2% to 3%.

2. Process according to claim 1 in which the sulphonium compound is an ester of a mono-, bis- or tris-β-hydroxyethyl sulphonium salt.

3. Process according to claim 2 in which the sulphonium compound is a sulphonium salt of the formula

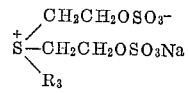

where $R_3$ represents an alkyl, substituted alkyl, alicyclic, aralkyl, aromatic or heterocyclic residue.

4. Process according to claim 3 in which the sulphonium compound is disodium tris-(β-sulphatoethyl) sulphonium inner salt.

5. Process according to claim 1 in which the reactive polymeric substance is a hydroxyalkyl cellulose.

6. Process according to claim 1 in which the reactive polymeric substance is a condensation product of ethylene oxide and a polyamide forming substance.

7. Process according to claim 1 in which the shaped article is a textile material.

8. Process according to claim 1 in which the shaped article is a film.

9. The product obtained by the process of claim 1.

References Cited by the Examiner
UNITED STATES PATENTS

| | | | |
|---|---|---|---|
| 2,220,508 | 11/1940 | Bock et al. | 117—139.5 |
| 2,270,841 | 1/1942 | Bock et al. | 117—165 |
| 2,541,773 | 2/1951 | Lolkema et al. | 117—165 X |
| 2,990,298 | 6/1961 | Moyse et al. | 117—139.5 |

WILLIAM D. MARTIN, *Primary Examiner.*

T. G. DAVIS, *Assistant Examiner.*